US006996286B2

(12) United States Patent
Dolazza

(10) Patent No.: US 6,996,286 B2
(45) Date of Patent: Feb. 7, 2006

(54) SWEEPING SPATIAL FILTER SYSTEM AND METHOD

(75) Inventor: Enrico Dolazza, Boston, MA (US)

(73) Assignee: Analogic Corporation, Peabody, MA (US)

( * ) Notice: Subject to any disclaimer, the term of this patent is extended or adjusted under 35 U.S.C. 154(b) by 351 days.

(21) Appl. No.: 10/021,125

(22) Filed: Oct. 30, 2001

(65) Prior Publication Data

US 2003/0081855 A1 May 1, 2003

(51) Int. Cl.
*G06K 9/40* (2006.01)

(52) U.S. Cl. .................................... 382/260; 345/440.1

(58) Field of Classification Search ................ 382/260, 382/261

See application file for complete search history.

(56) References Cited

U.S. PATENT DOCUMENTS 3,956,960 A * 5/1976 Deutsch ........................ 84/622
4,874,992 A * 10/1989 Benson et al. .............. 315/387
5,521,713 A * 5/1996 Oikawa ...................... 386/112
5,579,463 A * 11/1996 Takano et al. .............. 345/440
5,870,502 A * 2/1999 Bonneau et al. ............ 382/249
6,487,528 B1 * 11/2002 Vossing et al. ............. 704/229
6,519,533 B1 * 2/2003 Jeffryes ....................... 702/17

* cited by examiner

*Primary Examiner*—Joseph Mancuso
*Assistant Examiner*—Dennis Rosario
(74) *Attorney, Agent, or Firm*—McDermott Will & Emery LLP

(57) ABSTRACT

A method of providing a spatially filtered version of an image by selectively modifying image pixel amplitudes as a predetermined function of spatial frequency components of the image pixels includes dividing an overall frequency range of the image into a plurality of constituent frequency ranges. The method provides, for each of the constituent frequency ranges, a spatial filter for receiving the image pixels and producing a filtered output representative of the spatial frequency components of the pixels that are within that constituent frequency range. The method further includes scaling each of the filtered outputs by a scaling factor specific to the associated spatial filter, so as to produce a scaled output. Finally, the method includes combining the scaled outputs to produce a composite output representative of the spatially filtered version of the image. The scaling factors may include a predetermined set of values for a particular filter response, or the scaling factors may be time-varying so that the filter response changes as a function of time.

32 Claims, 7 Drawing Sheets

SWEEPING SPATIAL FILTER SYSTEM AND METHOD

CROSS-REFERENCE TO RELATED APPLICATIONS

This application is related to the following U.S. applications, of common assignee, the contents of which are incorporated herein in their entirety by reference:

"Adaptive Spatial Filter," invented by Enrico Dolazza, U.S. patent application Ser. No. 09/651,529; and, "Adaptive Spatial And Temporal Filter For Noise Reduction In Image Sequences," invented by Enrico Dolazza, U.S. patent application Ser. No. 09/651,535.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to image filtering, and more particularly, to systems for and methods of spatial image filtering, wherein the filter response characteristics may be modified to meet the needs of the user.

"Level and Window" concept—In digital radiography (DR), an acquired image may be characterized by a dynamic range that is significantly larger than the display system or the ability of the person viewing the image to resolve the image. Consider an acquired image with an exemplary dynamic range of 12 bits, i.e., 2048 intensity states. The resolution of the human eye is limited under the best conditions to only a few hundred grayscale levels. Typically, the human eye is limited to less than one hundred grayscale levels. The level and window concept maps a portion of the acquired dynamic range into a display system. For example, a display may have a dynamic range of 8 bits, or 256 grayscale states. Using the level and window concept, the display would then map any arbitrary portion of the overall image dynamic range. The user may select which portion of the acquired image dynamic range is to be mapped to the display, or the range may be "swept" across the entire dynamic range while the user observes the display. The ability to view different portions of the dynamic range is useful to the user because certain aspects of the image may only be apparent in particular portions of the dynamic range, or they may be much more pronounced in those portions of the dynamic range.

Subjects of x-ray images have varying degrees of contrast and physical size. One category of subjects (e.g., masses) are characterized by large physical size in the image (with respect to surrounding and overlapping structures that are of no diagnostic interest), but may have relatively constant contrast across the object (i.e., homogenous with respect to intensity level). These subjects may not be easy to discern within the x-ray image when the subject overlaps an object with high contrast characteristics. These subjects are characterized by relatively low spatial frequency components in the image, due to their physical size and constant contrast characteristics. Low-pass filtering of these subjects can therefore be used to differentiate them from overlapping objects having high contrast characteristics.

Another category of subjects (e.g., instances of micro-calcification) has high contrast, but are characterized by physically small details that make them difficult to detect, regardless of the background. These subjects are generally characterized by wide-band and/or high spatial frequency components in the image. High-pass filtering of these subjects helps to discern the subjects from other objects by increasing the contrast of the subject with respect to surrounding and overlapping structures. Due to the wide-band nature of some of these subjects, however, a high-pass filter may also reduce useful information regarding the subjects.

Prior art image filtering systems typically provide a fixed frequency response at a given point in time, depending upon the particular application for which the filter is being used. Some prior art image filters provide adaptive capabilities to optimize signal to noise characteristics of the image, but such filters are typically adaptive only to components of the image itself. One disadvantage to such prior art filtering systems is that a single, fixed frequency response filter can not clearly show all aspects of a particular image, as described herein.

It is an object of the present invention to substantially overcome the above-identified disadvantages and drawbacks of the prior art.

SUMMARY OF THE INVENTION

The foregoing and other objects are achieved by the invention, which in one aspect comprises a method of providing a spatially filtered version of an image, where the associated filtering characteristics are continuously and dynamically varied in time, with little or no control required by an operator. The method provides the spatially filtered version of the image by selectively modifying image pixel amplitudes as a predetermined function of spatial frequency components of the image pixels. The method includes dividing an overall frequency range of the image into a plurality of constituent frequency ranges. The method provides, for each of the constituent frequency ranges, a spatial filter for receiving the image pixels and producing a filtered output representative of the spatial frequency components of the pixels that are within that constituent frequency range. The method further includes scaling each of the filtered outputs by a scaling factor specific to the associated spatial filter, so as to produce a scaled output. Finally, the method includes combining the scaled outputs to produce a composite output representative of the spatially filtered version of the image.

In another embodiment of the invention, the constituent frequency ranges are defined by octaves, such that each constituent frequency range is one half as wide as the next larger constituent frequency range.

In another embodiment of the invention, the constituent frequency ranges are substantially contiguous.

In another embodiment of the invention, the constituent frequency ranges overlap one another.

In another embodiment of the invention, each of the scaling factors is a function of time.

In another embodiment of the invention, the scaling factors vary as a function of time so as to sweep a pass-band having a predetermined bandwidth across the overall frequency range, such that image components characterized by frequencies within the pass-band are enhanced or passed without substantial attenuation.

In another embodiment of the invention, image components characterized by frequencies outside of the pass-band are substantially suppressed.

In another embodiment of the invention, image components characterized by frequencies outside of the pass-band are attenuated but not substantially suppressed.

In another embodiment of the invention, the predetermined bandwidth varies as a function of time.

In another embodiment of the invention, the scaling factors vary as a function of time so as to sweep two or more pass-bands. Each pass-band has a predetermined bandwidth, across the overall frequency range, such that image components characterized by frequencies within each of the pass-bands are enhanced, or are passed without substantial attenuation.

In another embodiment of the invention, image components characterized by frequencies outside of the pass-band are substantially suppressed.

In another embodiment of the invention, image components characterized by frequencies outside of the pass-band are attenuated but not substantially suppressed.

In another embodiment of the invention, the predetermined bandwidth varies as a function of time.

In another embodiment of the invention, the spatial filter produces a filtered output as a predetermined function of a neighborhood of pixels.

In another aspect, the invention comprises a system for providing a spatially filtered version of an image by selectively modifying image pixel amplitudes as a predetermined function of spatial frequency components of the image pixels. The system includes a frequency divider for dividing an overall frequency range of the image into a plurality of constituent frequency ranges. For each of the constituent frequency ranges, the system further includes (i) a spatial filter that receives the image pixels and produces a filtered output representative of the spatial frequency components of the pixels that are within that constituent frequency range, and (ii) a multiplier that scales each of the filtered outputs by a scaling factor specific to the associated spatial filter, so as to produce a scaled output. The system also includes a combiner for combining the scaled outputs to produce a composite output representative of the spatially filtered version of the image.

In another embodiment of the invention, the constituent frequency ranges are defined by octaves, such that each constituent frequency range is one half as wide as the next larger constituent frequency range.

In another embodiment of the invention, the constituent frequency ranges are substantially contiguous.

In another embodiment of the invention, the constituent frequency ranges overlap one another.

In another embodiment of the invention, each of the scaling factors is a function of time.

In another embodiment of the invention, the scaling factors vary as a function of time so as to sweep a pass-band having a predetermined bandwidth across the overall frequency range, such that image components characterized by frequencies within the pass-band are enhanced or passed without substantial attenuation.

In another embodiment of the invention, image components characterized by frequencies outside of the pass-band are substantially suppressed.

In another embodiment of the invention, image components characterized by frequencies outside of the pass-band are attenuated but not substantially suppressed.

In another embodiment of the invention, the predetermined bandwidth varies as a function of time.

In another embodiment of the invention, the scaling factors vary as a function of time so as to sweep two or more pass-bands, each characterized by a predetermined bandwidth, across the overall frequency range. The image components characterized by frequencies within each of the pass-bands are enhanced, or passed without substantial attenuation.

In another embodiment of the invention, image components characterized by frequencies outside of the passband are substantially suppressed.

In another embodiment of the invention, image components characterized by frequencies outside of the passband are attenuated but not substantially suppressed.

In another embodiment of the invention, the predetermined bandwidth varies as a function of time.

In another embodiment of the invention, the spatial filter produces a filtered output as a predetermined function of a neighborhood of pixels.

In another aspect, the invention comprises a method of a spatially filtering an image, including providing a spatial filter for receiving an array of intensity values corresponding to the image, and for producing a plurality of filtered outputs. Each of the filtered outputs represents the intensity values that have frequency components within a predetermined frequency range. The method further includes scaling each of the filtered outputs by an associated scaling factor, so as to produce a plurality of scaled outputs. The method also includes combining the scaled outputs to produce a composite output representative of a spatially filtered version of the image.

In another embodiment of the invention, each of the scaling factors is a function of time.

In another embodiment of the invention, the scaling factors vary as a function of time so as to sweep a pass-band having a predetermined bandwidth across the overall frequency range, such that image components characterized by frequencies within the pass-band are enhanced, or passed without substantial attenuation.

In another embodiment of the invention, image components characterized by frequencies outside of the pass-band are substantially suppressed.

In another embodiment of the invention, image components characterized by frequencies outside of the pass-band are attenuated, but not substantially suppressed.

In another embodiment of the invention, the predetermined bandwidth varies as a function of time.

In another embodiment of the invention, the scaling factors vary as a function of time so as to sweep two or more pass-bands, each having a predetermined bandwidth, across the overall frequency range. Image components characterized by frequencies within each of the pass-bands are enhanced, or passed without substantial attenuation.

In another embodiment of the invention, image components characterized by frequencies outside of the pass-band are substantially suppressed.

In another embodiment of the invention, image components characterized by frequencies outside of the pass-band are attenuated but not substantially suppressed.

In another embodiment of the invention, the predetermined bandwidth varies as a function of time.

In another aspect, the invention comprises a system for a spatially filtering an image, including a spatial filter for receiving an array of intensity values corresponding to the image, and for producing a plurality of filtered outputs. Each of the filtered outputs represents the intensity values having frequency components within a predetermined frequency range. The system further include a plurality of multipliers for scaling each of the filtered outputs by an associated scaling factor, so as to produce a plurality of scaled outputs. The system also includes a combiner for combining the scaled outputs to produce a composite output representative of a spatially filtered version of the image.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1A:
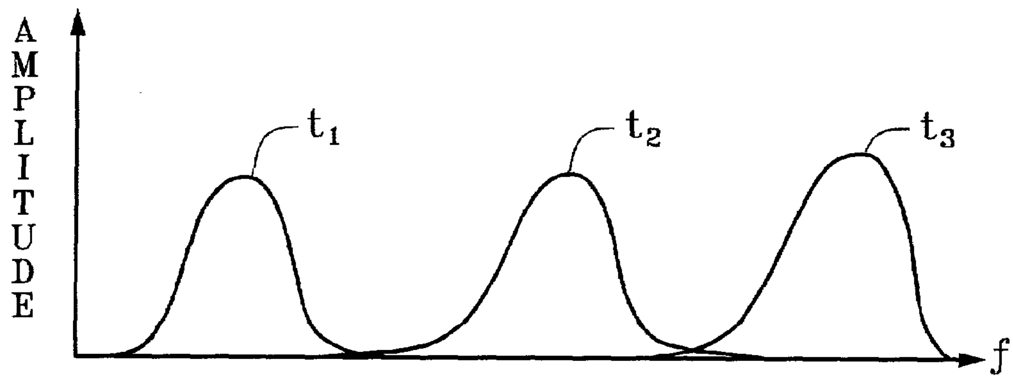
FIG. 1A shows a bandpass response swept across the image spectrum as a function of time according to the present invention.
Figure 1B:
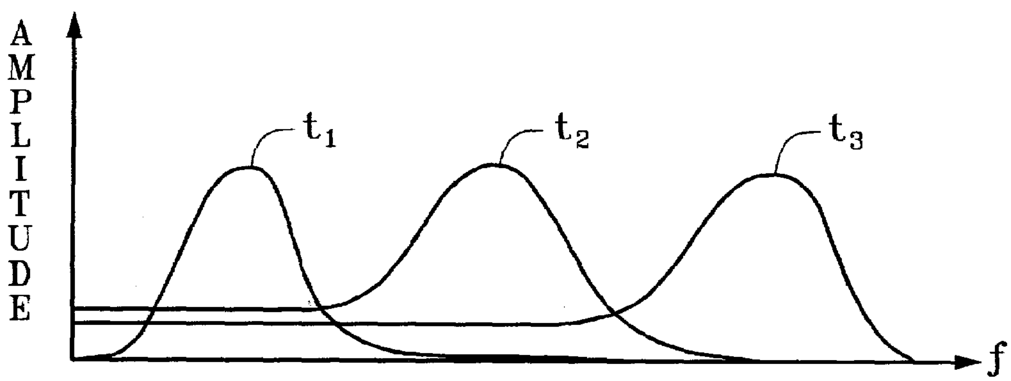
FIG. 1B shows a bandpass response swept across the image spectrum as a function of time without completely attenuating regions outside of the passband.
Figure 1C:
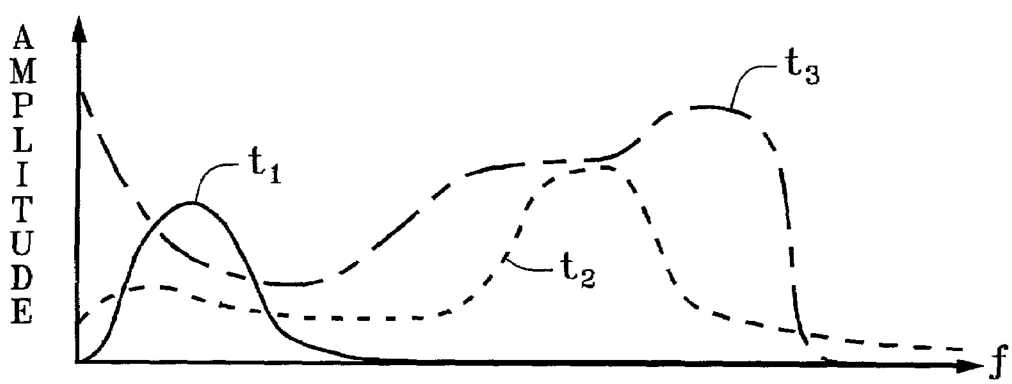
FIG. 1C shows a spectral response swept across the image spectrum as a function of time according to the present invention.

As described herein for the Level and Window concept, it is often useful to sweep a reduced dynamic range window through the overall dynamic range. Similarly, it is often useful to sweep a modified frequency window (in the spatial domain) through the overall frequency range of the image. As used herein, the term "sweep" means to selectively shape the spectral response of a spatial filter. Sweeping may include being able to place a fixed spectral response anywhere within the image spectrum. Sweeping may also include moving a bandpass response across the image spectrum as a function of time, as shown in FIG. 1A, wherein the response is shown at time t1 at time t2 and at time t3. Sweeping may also include, as shown in FIG. 1B, moving the primary pass-band of a passband response across the image spectrum as a function of time, such that frequency ranges where the pass-band was at some other time are not completely attenuated. FIG. 1B also shows the response at different times t1, t2 and t3. Further, sweeping may include moving (i.e., sweeping) the response as shown in FIG. 1B, while also changing the shape of the response as a function of time, as shown in FIG. 1C. The responses in FIG. 1C are shown at times t1, t2 and t3.

Figure 2:
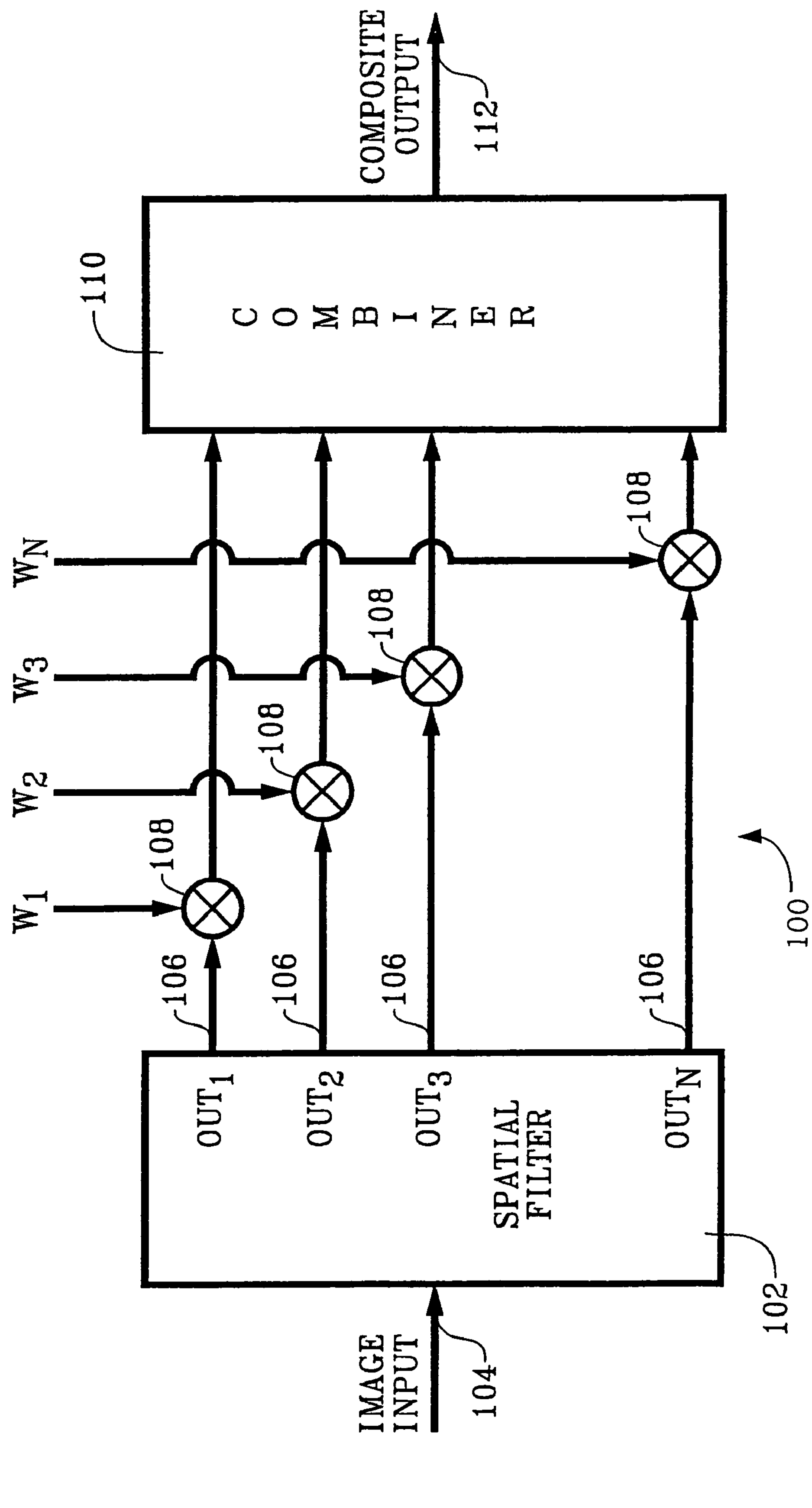
FIG. 2 shows one preferred embodiment of a sweeping spatial filter system.

FIG. 2 shows one preferred embodiment of a sweeping spatial filter system 100, including a spatial filter 102 having an input 104 for receiving an array of intensity values that define the image. In one embodiment, the array of intensity values corresponds to a set of pixels that constitute the image, such that each pixel is characterized by an intensity value. In other embodiments, the image may be formed from regions of the image that are not pixelated, but are delineated in other manners known to those in the art. The spatial filter 102 includes a plurality of outputs 106. In FIG. 2, each of the outputs 106 is labeled at the spatial filter 102 with a label OUTi, where i is an integer from 1 to N, and N represents the number of outputs 106. Each of the outputs 106 is coupled to a multiplier 108, and each multiplier 108 also receives a scaling factor wi. A combiner 110 receives an output from each of the multipliers 108, combines them in a predetermined manner (described in more detail herein), and produces a composite output 112 that represents the spatially filtered image.

Figure 3:
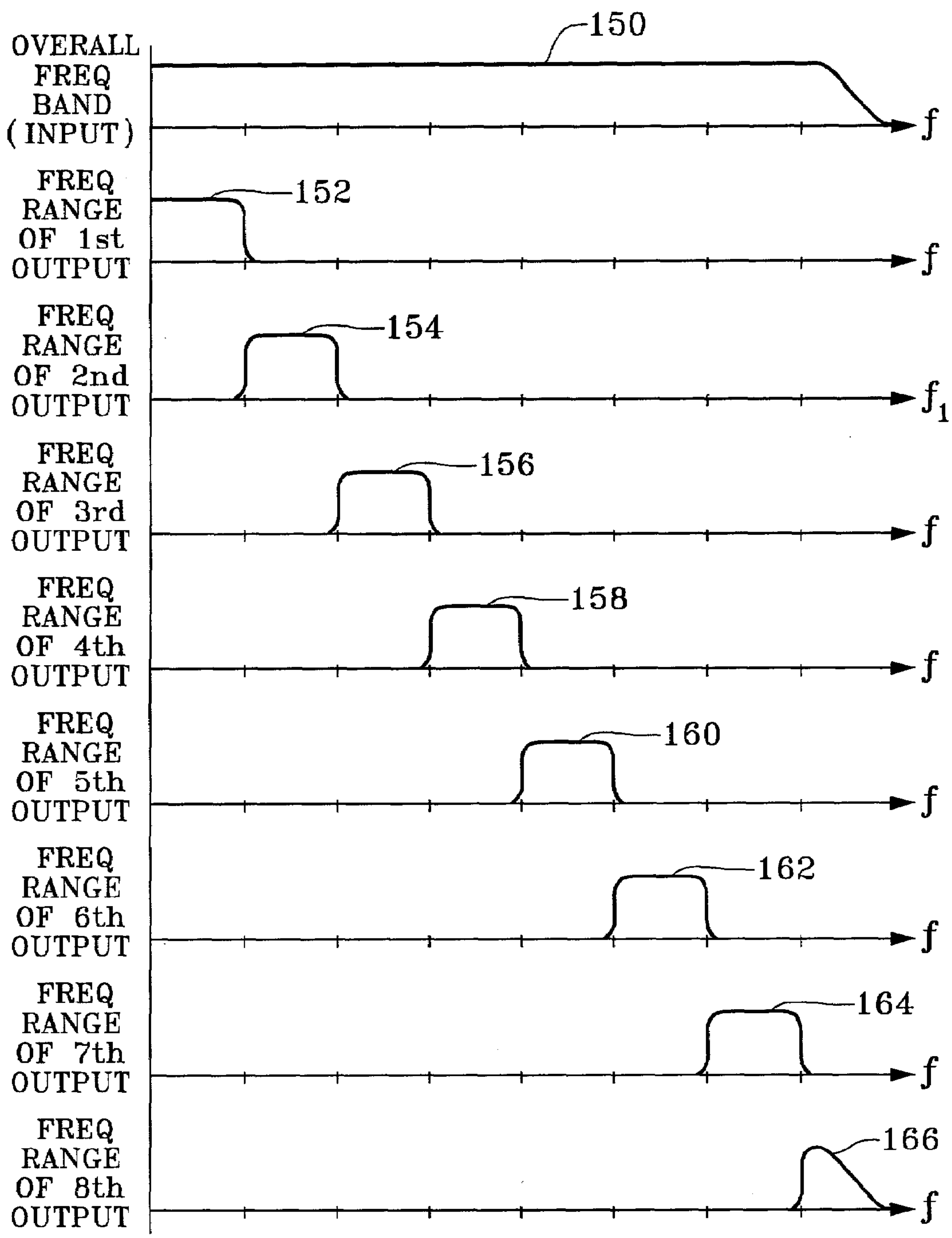
FIG. 3 shows the frequency characteristics for an exemplary embodiment of the spatial filter of FIG. 2.

Each of the outputs 106 of the spatial filter 102 corresponds to a frequency range that lies within the overall frequency bandwidth of the image. Each output 106 thus includes the intensity values of pixels having frequency components that fall within the frequency range of that particular output 106. FIG. 3 shows the frequency characteristics for an exemplary embodiment of the spatial filter 102 with eight outputs 106. The overall frequency band 150 of the image is shown in the top graph, and the eight constituent frequency ranges 152 through 166, corresponding to the eight outputs 106, are shown below the overall frequency band 150.

In general, the value of the scaling factor wi may be any real number greater than or equal to zero. When 0>wi>1, the multiplier 108 attenuates the output 106 (i.e., reduces the intensity). When wi=1, the multiplier 108 passes the output 106 unchanged. When wi>1, the multiplier 108 enhances the output 106 (i.e., increases the intensity). In some embodiments, the scaling factor wi may be a function of time, i.e., wi(t). The scaling factor wi (t) may be tailored to assume any value greater than or equal to zero as a function of time. The scaling factors, whether static or a function of time, are generally independent of one another, although in some embodiments the scaling factors may be characterized by some amount of interdependency.

In one preferred embodiment, the combiner 110 adds the outputs of the multipliers 108, such that the composite output 112 is a simple sum of the multiplier outputs. When all of the scaling factors wi are equal to 1 in this embodiment, the image corresponding to the composite output 112 is essentially the same as the image corresponding to the input 104.

Figure 4:
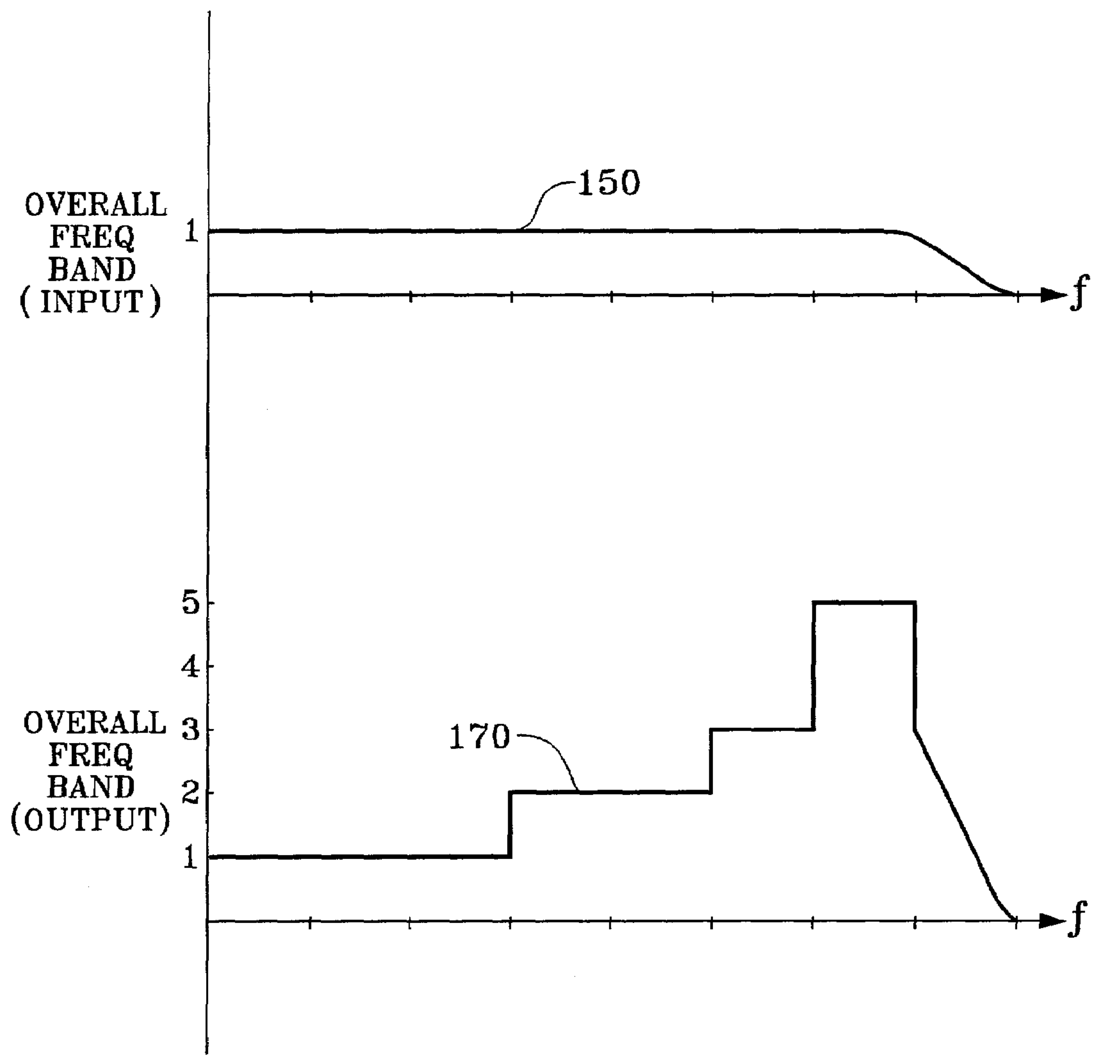
FIG. 4 shows the spatial frequency response of the embodiment of FIG. 2 with exemplary scaling factors.

The invention provides a versatile spatial frequency response across the overall frequency range of the image by varying the scaling factors wi with respect to one another. FIG. 4 shows the spatial frequency response 170 of the embodiment of FIG. 2 with exemplary scaling factors as follows: w1=1, w2=1, w3=2, w4=2, w5=3, w6=5, w7=5, w8=3. Alt this example presents a filter architecture with eight scaling factors, any number of scaling factors may be used. This example demonstrates a spatial filter that enhances higher frequencies of the overall frequency band 150 while passing the lower frequencies unchanged. By appropriately setting the scaling factors wi, the invention can produce any desired frequency response. Further, higher frequency resolution of the frequency response 170 may be obtained by increasing the number of filter outputs 106 and corresponding scaling factors wi.

In one embodiment, several sets of scaling factors may be preset for convenient retrieval by the user. For example, as described herein, certain structures in an x-ray image are more easily distinguishable when a particular spatial filter response is utilized. One such preset of scaling factors may be optimized for finding masses. A user (e.g., a radiologist) could quickly choose a "mass" preset if conditions suggest a mass may be present. Similarly, a different preset of scaling factors may be optimized for finding micro-calcification structures, so that the user may select a "micro-calcification" preset to search for micro-calcification structures. Thus, during a single examination of an x-ray image, the user may choose several scaling factor presets during his or her examination of the image.

Figure 5:
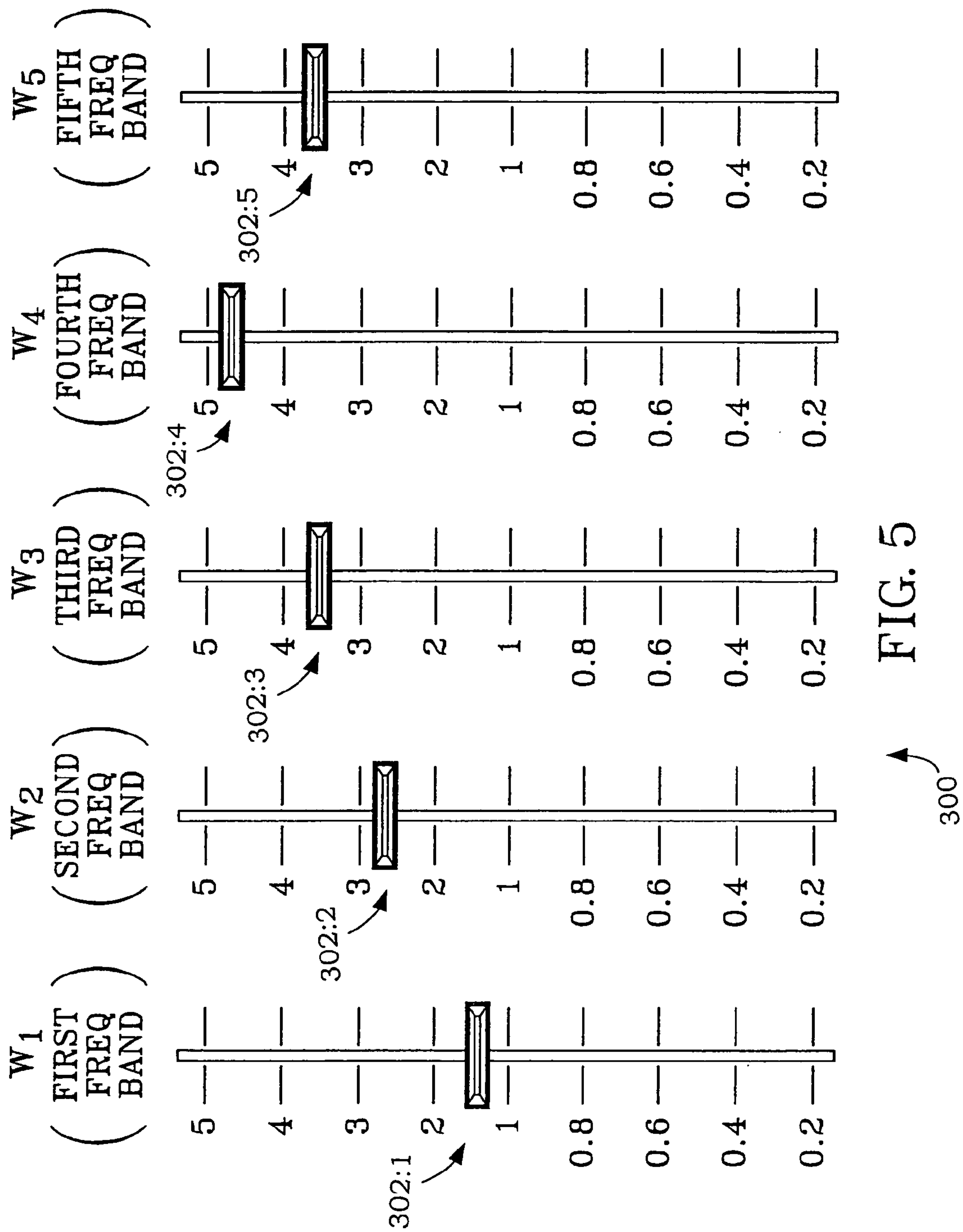
FIG. 5 shows an exemplary control device for varying the values of the scaling factors.

In another embodiment, the user may be provided with a control device for varying the values of the scaling factors. The control device 300, an example of which is shown in FIG. 5, may be similar to an audio equalizer available on many commercial sound systems. The exemplary control device 300 includes a control element 302 for each of the scaling factors wi. In this example, the control device 300 includes five such control elements, labeled 302:1 through 302:5, consistent with the embodiment of the invention shown in FIG. 6 (described herein). A user may tailor the spatial filter response in real time by manipulating such a control device, so as to maximize his or her ability to distinguish a particular subject within the image.

In yet another embodiment, each of the scaling factors may be a function of time wi(t). In this embodiment, each function wi(t) may be predetermined, so that the user merely selects a particular preset group of functions wi(t) and initiates a sweep from some start time t1 to an end time t2. In some embodiments, the user may have control of the variable t, so that he or she may progress the functions wi(t) (and thus, the filter response) from t1 to t2 at whatever rate he or she desires. Control of the variable t may be bidirectional (i.e., the user may decrease as well as increase the variable t), so that the user can progress and regress the scaling functions wi(t). Progression/regression of the scaling functions wi(t) allows the user to more easily find the optimum filter response for a particular subject. The user can search for the optimum filter response by "sliding" the variable t back and forth, while observing the filtered image to discern the subject of interest from the background. Thus, by providing an image filter with frequency characteristics that are continuously and dynamically variable, the present invention enhances the detectability of subjects of interest within the filtered image. Subjects of interest that were obscure in a static image are more easily distinguishable from surrounding structures when the image is varied in the frequency domain. Further, the invention provides continuously and dynamically variable frequency characteristics via automatic processes (e.g., preset fixed scaling factors, preset scaling factors as functions of time, etc.) so as to require little or no operator intervention.

Figure 6:
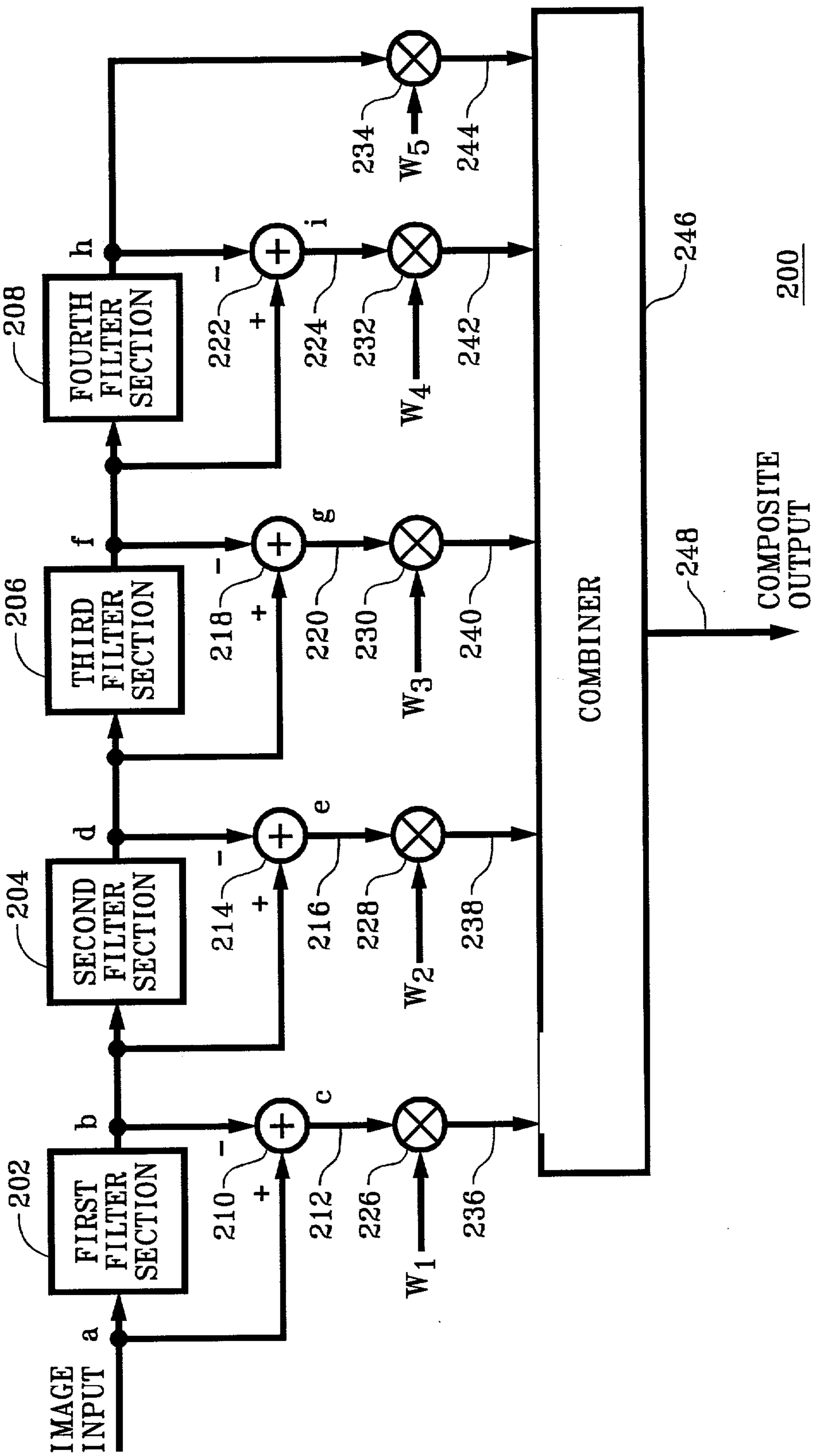
FIG. 6 shows another embodiment of the sweeping spatial filter system of FIG. 2; and, FIG. 7 illustrates the frequency spectra for various points of the filter system of FIG. 6.
Figure 7:
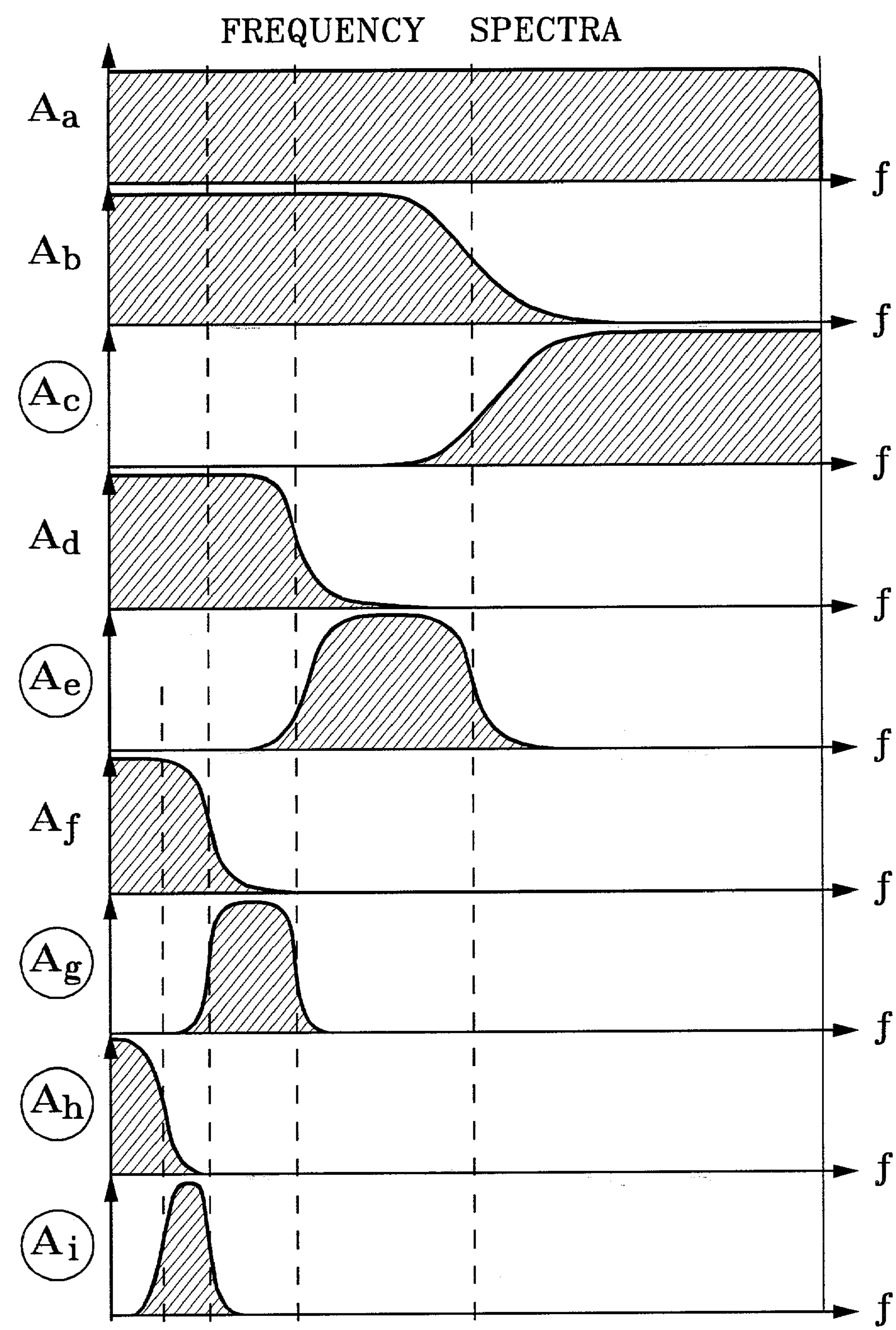

Another preferred embodiment 200 of the present invention is shown in FIG. 6. The structure of this embodiment is described in detail in the copending U.S. patent application Ser. No. 09/651,529. The embodiment shown in FIG. 6 includes four filter sections 202, 204, 206 and 208. A first summer 210 subtracts the output of the first filter section 202 from the input of the first filter section 202 to produce a first intermediate output 212. A second summer 214 subtracts the output of the second filter section 204 from the input of the second filter section 204 to produce a second intermediate output 216. A third summer 218 subtracts the output of the third filter section 206 from the input of the third filter section 206 to produce a third intermediate output 220. A fourth summer 222 subtracts the output of the fourth filter section 208 from the input of the fourth filter section 208 to produce a fourth intermediate output 224. In FIG. 6, the filter section inputs, filter section outputs, and the summer outputs are labeled with small case letters a through h. FIG. 7 illustrates the frequency spectra Aa through Ah for each of the eight labeled locations. The frequency spectra of the four summer outputs 212, 216, 220 and 224 (i.e., Ac, Ae, Ag and Ai), along with the output of the fourth filter section 208 (i.e., Ah) are shown with a circled label in FIG. 7. The frequency characteristics shown in FIG. 6 are conceptual only; although spectra are shown with finite roll-off at the band edges, ringing and other consequences of realizable filters are not shown. These five spectra (Ac, Ae, Ag, Ai, and Ah) are provided to five corresponding multipliers (226, 228, 230, 232 and 234, respectively), where they are multiplied by a corresponding scaling factor (w1, w2, w3, w4 and w5, respectively). The resulting five outputs are received by the combiner 246, where they are summed to form the composite output 248.

The filter sections 202, 204, 206 and 208 operate to halve the bandwidth of the incoming frequency range. This may be seen in FIG. 7, where the output spectrum Ab of the first filter section 202 is approximately one half of its input, the overall frequency band Aa. Similarly, the output spectrum Ad of the second filter section 204 is approximately one half of its input, Ab; the output spectrum Af of the third filter section 206 is approximately one half of its input, Ad; and, the output spectrum Ah of the fourth filter section 208 is approximately one half of its input, Af.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A method of providing a spatially filtered version of an image by selectively modifying image pixel amplitudes as a predetermined function of spatial frequency components of the image pixels, comprising:

dividing an overall frequency range of the image into a plurality of constituent frequency ranges;

providing, for each of the constituent frequency ranges, a spatial filter that receives the image pixels and produces a filtered output representative of the spatial frequency components of the pixels that are within that constituent frequency range;

scaling image pixel amplitude values for each of the filtered outputs by a scaling factor specific to the associated spatial filter, so as to produce a scaled output; and, combining the scaled outputs to produce a composite output representative of the spatially filtered version of the image wherein the scaling factors vary as a function of time so as to sweep a pass-band having a predetermined bandwidth across the overall frequency range, such that image components characterized by frequencies within the pass-band are enhanced or passed without substantial attenuation.

2. A method according to claim 1, wherein the constituent frequency ranges are defined by octaves, such that each constituent frequency range is one half as wide as the next larger constituent frequency range.

3. A method according to claim 1, wherein the constituent frequency ranges are substantially contiguous.

4. A method according to claim 1, wherein the constituent frequency ranges overlap one another.

5. A method according to claim 1, wherein image components characterized by frequencies outside of the pass-band are substantially suppressed.

6. A method according to claim 1, wherein image components characterized by frequencies outside of the pass-band are attenuated but not substantially suppressed.

7. A method according to claim 1, wherein the predetermined bandwidth varies as a function of time.

8. A method according to claim 1, wherein the scaling factors vary as a function of time so as to sweep two or more pass-bands, each having a predetermined bandwidth, across the overall frequency range, such that image components characterized by frequencies within each of the pass-bands are enhanced, or are passed without substantial attenuation.

9. A method according to claim 8, wherein image components characterized by frequencies outside of the pass-band are substantially suppressed.

10. A method according to claim 8, wherein image components characterized by frequencies outside of the pass-band are attenuated but not substantially suppressed.

11. A method according to claim 8, wherein the predetermined bandwidth varies as a function of time.

12. A method according to claim 1, wherein the spatial filter produces a filtered output as a predetermined function of a neighborhood of pixels.

13. A system for providing a spatially filtered version of an image by selectively modifying image pixel amplitudes as a predetermined function of spatial frequency components of the image pixels, comprising:

a frequency divider for dividing an overall frequency range of the image into a plurality of constituent frequency ranges;

for each of the constituent frequency ranges, (i) a spatial filter that receives the image pixels and produces a filtered output representative of the spatial frequency components of the pixels that are within that constituent frequency range, and (ii) a multiplier tat scales image pixel amplitude values for each of the filtered outputs by a scaling factor specific to the associated spatial filter, so as to produce a scaled output; and, a combiner for combining the scaled outputs to produce a composite output representative of the spatially filtered version of the image wherein the scaling factors vary as a function of time so as to sweep a passband having a predetermined bandwidth across the overall frequency range, such that image components characterized by frequencies within the passband are enhanced or passed without substantial attenuation.

14. A system according to claim 13, wherein the constituent frequency ranges are defined by octaves, such that each constituent frequency range is one half as wide as the next larger constituent frequency range.

15. A system according to claim 13, wherein the constituent frequency ranges are substantially contiguous.

16. A system according to claim 13, wherein the constituent frequency ranges overlap one another.

17. A system according to claim 13, wherein image components characterized by frequencies outside of the passband are substantially suppressed.

18. A system according to claim 13, wherein image components characterized by frequencies outside of the passband are attenuated but not substantially suppressed.

19. A system according to claim 13, wherein the predetermined bandwidth varies as a function of time.

20. A system according to claim 13, wherein the scaling factors vary as a function of time so as to sweep two or more passbands, each having a predetermined bandwidth, across the overall frequency range, such that image components characterized by frequencies within each of the passbands are enhanced or passed without substantial attenuation.

21. A system according to claim 20, wherein image components characterized by frequencies outside of the passband are substantially suppressed.

22. A system according to claim 20, wherein image components characterized by frequencies outside of the passband are attenuated but not substantially suppressed.

23. A system according to claim 20, wherein the predetermined bandwidth varies as a function of time.

24. A system according to claim 13, wherein the spatial filter produces a filtered output as a predetermined function of a neighborhood of pixels.

25. A method of a spatially filtering an image, comprising:

providing a spatial filter for receiving an may of intensity values corresponding to the image, and for producing a plurality of filtered outputs, each of which represents the intensity values having frequency components within a predetermined frequency range;

scaling the intensity values for each of the filtered outputs by an associated scaling factor, so as to produce a plurality of scaled outputs; and, combining the scaled outputs to produce a composite output representative of a spatially filtered version of the image wherein the scaling factors vary as a function of time so as to sweep a passband having a predetermined bandwidth across the overall frequency range, such that mane components characterized by frequencies within the passband are enhanced, or passed without substantial attenuation.

26. A method according to claim 25, wherein image components characterized by frequencies outside of the passband are substantially suppressed.

27. A method according to claim 25, wherein image components characterized by frequencies outside of the passband are attenuated, but not substantially suppressed.

28. A method according to claim 25, wherein the predetermined bandwidth varies as a function of time.

29. A method according to claim 25, wherein the scaling factors vary as a function of time so as to sweep two or more passbands, each having a predetermined bandwidth, across the overall frequency range, such that image components characterized by frequencies within each of the passbands are enhanced, or passed without substantial attenuation.

30. A method according to claim 29, wherein image components characterized by frequencies outside of the passband are substantially suppressed.

31. A method according to claim 29, wherein image components characterized by frequencies outside of the passband are attenuated but not substantially suppressed.

32. A method according to claim 29, wherein the predetermined bandwidth varies as a function of time.

* * * * *

UNITED STATES PATENT AND TRADEMARK OFFICE

CERTIFICATE OF CORRECTION

PATENT NO. : 6,996,286 B2
APPLICATION NO. : 10/021125
DATED : February 7, 2006
INVENTOR(S) : Enrico Dolazza It is certified that error appears in the above-identified patent and that said Letters Patent is hereby corrected as shown below:

IN THE CLAIMS:

Column 9, line 34, delete “tat” and insert therefore -- that --;

Column 10, line 20, delete “may” and insert therefore -- array --; and

Column 10, line 34, delete “mane” and insert therefore -- image --.

Signed and Sealed this

Twenty-sixth Day of June, 2007

JON W. DUDAS
*Director of the United States Patent and Trademark Office*